E. S. COLE.
MECHANISM FOR USE IN CONNECTION WITH FLOWING STREAMS.
APPLICATION FILED FEB. 28, 1910.
1,041,432.
Patented Oct. 15, 1912.
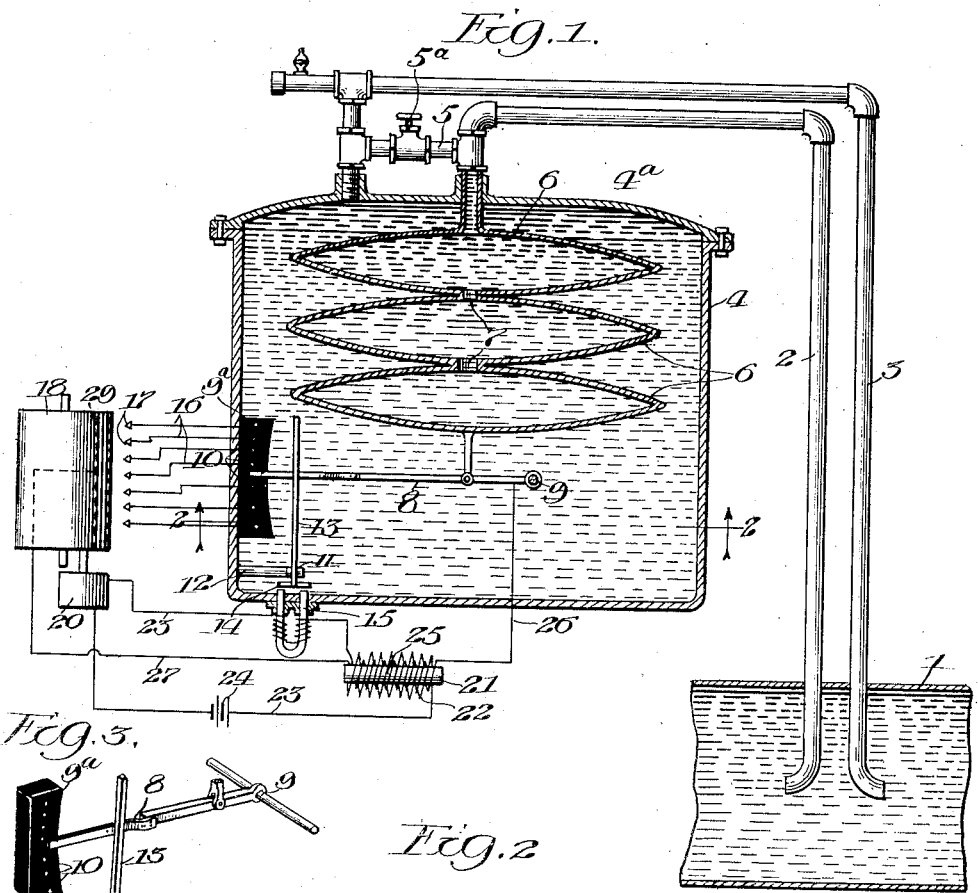
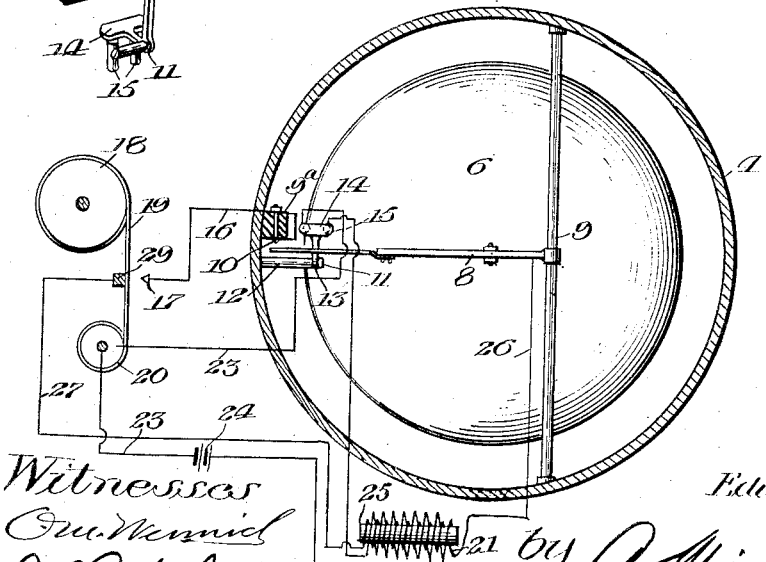
Witnesses
Inventor
Edward S. Cole.

UNITED STATES PATENT OFFICE.

EDWARD S. COLE, OF NEW YORK, N. Y.

MECHANISM FOR USE IN CONNECTION WITH FLOWING STREAMS.

1,041,432.      Specification of Letters Patent.      Patented Oct. 15, 1912.

Application filed February 28, 1910. Serial No. 546,560.

*To all whom it may concern:*

Be it known that I, EDWARD S. COLE, a citizen of the United States, residing at New York, in the county of New York and State of New York, have invented a certain new and useful Improvement in Mechanism for Use in Connection with Flowing Streams, of which the following is a full, clear, concise, and exact description, reference being had to the accompanying drawings, forming a part of this specification.

My invention relates in general to devices for measuring and recording the speed or velocity of flowing streams, and in particular to that class of velocity meters, in which the operation of the meter is accomplished by communicating to it the dynamic or speed pressure of the flowing stream, and also the static pressure of the same.

Devices of this kind are often operated by a pitometer,—that is, a pair of tubes or pipes having bent ends, one of which faces up-stream and the other down-stream in the pipe or conduit, the velocity of whose flowing stream is to be measured. This pitometer is connected to the recording device which indicates and records the velocity of the flowing stream.

In the recording device herein set forth for carrying out my invention, I provide a hollow member, whose walls are, in whole or in part, sufficiently flexible to permit it to expand or contract, or otherwise vary in size or shape, and the pitometer is connected to this hollow member, so that variations in the speed of the flowing stream will cause movements of the walls or parts thereof of said hollow member. The movements of said member are communicated by suitable mechanism, which is operated so as to form a record indicating the velocity of the flowing stream. This recording mechanism may be of any suitable form, a convenient arrangement being that shown herein, consisting of a traveling record sheet, and a series of metallic points, through which an electric circuit is closed, so as to cause sparks to jump from said points through the paper, thereby perforating the same. The hollow member, expansible or contractible, is conveniently inclosed in an outer casing, to which the pitometer is also connected.

In the accompanying drawings—Figure 1 is a view, partially in vertical section and partially in diagram, of a speed-measuring device embodying my present invention. Fig. 2 is a cross-sectional view of the same, taken on the line 2—2 of Fig. 1. Fig. 3 is a view of certain details of construction.

Referring to the drawings, I have shown a pipe or conduit 1, containing the flowing stream whose velocity is to be measured and recorded. This may be an ordinary water pipe or main having water flowing through it. To this pipe or main 1 is connected a pitometer comprising two tubes or pipes, 2 and 3, respectively, whose ends are bent so that the orifice of the pipe 2 faces up-stream and the orifice of the pipe 3 faces down stream.

The recording device proper comprises a casing 4, which may be of any suitable material, preferably metal, being constructed with a cover $4^a$, by which access can be had to its interior. The pipes 2 and 3 are extended to the cover $4^a$ of said casing 4, and the pipe 2 passes down through the center of the same. The pipe 2 is connected with said cover $4^a$. Said pipes 2 and 3 are connected together by a cross-pipe 5, having a valve $5^a$.

Within the casing 4 is a hollow member having flexible walls, a convenient arrangement being a series of hollow drums, 6, 6, 6, arranged one above the other and mechanically connected together so as to form substantially one unitary structure, and also communicating with one another by passages 7, 7. The uppermost drum 6 is connected with the tube 2, so that its interior communicates with the interior of said tube 2. Below the drums 6, 6, is a lever arm 8, pivoted to the cross-bar $9^a$, whose ends are supported in the sides of the casing 4. At one side of the casing 4 is secured a contact strip 9, provided with a series of contacts 10, 10, adapted to coöperate with the lever 8. The lever 8, however, is normally in such position that it will not touch the contacts 10, 10, if moved up and down vertically.

A bell-crank 11 is pivoted upon a bracket 12, secured to the side of the casing 4, and this bell-crank 11 has an arm 13, which is adapted to strike the lever 8, and force the same against the contact strip 9, or the contacts 10 thereon (Fig. 3). The other arm 14 of the bell-crank 11 is made in the form of an armature for an electro-magnet 15, secured in the bottom of a casing 4, so that the attraction of the arm 14 by the magnet 15 will cause the arm 13 to actuate the lever 8 in a direction crosswise of the movement it will be given by the expansion and contraction of the drums 6, 6.

Conductors 16, 16, are connected with the contacts 10, 10, and extend from the same, and terminate in spark points 17, 17. A rotary drum 18 is provided, and carries a record strip 19 of paper or other suitable material. A clock-work 20 is arranged at one side of the drum 18, as shown in Fig. 2, and draws the record strip 19 from the drum 18, and withdraws said strip upon itself. An induction coil 21 is provided, and its primary 22 is connected in circuit 23 with a battery 24.

The clock-work 20 is provided with mechanism by which the circuit 23 is automatically opened and closed, which mechanism may be any common form of make and break apparatus. The circuit 23 also includes the electro-magnet 15. The secondary 25 of the induction coil 21 is connected by a conductor 27 with a metal strip 29, located opposite the spark points 17, 17. Thus, the dynamic pressure of the flowing stream will be communicated by the pipe 2 to the interior of the hollow drum 6, 6, 6, and the static pressure of said stream will be communicated by the pipe 3 with the interior of the casing 4, it being understood that the casing 4 and the drums 6, 6, are filled with the liquid of the flowing stream. Variations in the velocity or speed of the flowing stream will obviously cause an expansion or contraction of the drums 6, 6, and thereby swing the arm or lever 8 in an upwardly or downwardly direction, so as to bring it opposite or adjacent to various contact points 10, 10. At the same time, the intermittent making and breaking of the battery circuit 23 will cause the electro-magnet 15 to vibrate the bell-crank 11, and thereby swing the arm 13 back and forth intermittently, and cause the lever or arm 8 to swing intermittently toward and away from the contact strip 9. When, therefore, the arm 8 is brought close to or in contact with one of the contacts 10, 10, a circuit will be closed through the secondary of the induction coil, and through the metal strip 29, and through one of the spark points 17, and the closure of this circuit will produce sparks between the strip 29 and said contact 17, and thereby perforate or burn the record strip. Variations in the velocity will thus be recorded upon the record strip by the perforations of sparks from the series of spark points 17, 17.

I claim—

1. The combination of a casing containing a hollow, expansible and contractible member, the casing being arranged to receive a static pressure of the flowing stream, and the hollow member being arranged to receive the velocity pressure of said stream; a conduit for a flowing stream, two pipes projecting into said conduit, one facing up stream and one facing down stream, one of said pipes leading into said casing, and the other pipe leading to within the expansible and contractible member, a swinging arm arranged within the casing and adapted to be actuated by the expansion and contraction of said member, a series of contact points arranged also within the casing and adapted to coöperate with said contact arm, a series of electrical circuits coöperating with said contact points, an induction coil arranged for inclusion in said electrical circuits, and metallic contacts associated therewith arranged to coöperate with the contact points of said electrical circuits, whereby the closure of said circuits forms a record by sparks from said contact.

2. A device of the class specified comprising a casing containing an expansible and collapsible member in the form of a series of intercommunicating hollow metallic drums, pipes or tubes extending respectively from said casing and from said expansible and collapsible member, and having bent ends adapted to face up-stream and down-stream in a pipe or conduit, a cross-pipe 5 having a valve 5ª, and connecting said tubes or pipes extending from the casing and said member, a swinging contact arm 8, arranged within the casing and pivotally mounted on a cross-bar 9, supported by said casing, a contact strip 9ª located in the casing, a series of contacts 10 provided in said contact strip, adapted to coöperate with the swinging contact arm 8, an electro-magnet 15 mounted on the casing and having its armature 14 provided with a swinging arm 13 adapted to swing the contact arm 8 toward the contact strip 9ª, a series of electrical circuits 16, 16, extending from the contacts 10, 10, and provided with spark points 17, 17, a contact strip 29 coöperating with the spark points 17, 17, a rotary drum 18; outside the casing arranged to pass between the contact strip 19 and the spark points 17, a clock-work 20, an induction coil including the electro-magnet 15 in its primary circuit, and including the aforesaid series of circuits in its secondary.

3. A device of the class described, comprising a contact arm, means responsive to changes in pressure operating said arm, contacts coöperating with said arm, a lever for contacting with said arm, and a casing inclosing said above mentioned elements, said lever being mounted to move at right angles to said contact arm, and means for moving said lever.

4. A device of the class described, comprising a contact arm, means responsive to changes in pressure for operating said arm, contacts coöperating with said arm, a lever for contacting with said arm and an electro-magnet for operating said lever.

5. A device of the class described, comprising a contact arm, contacts coöperating with said arm, a lever, a casing inclosing said above mentioned elements, and a magnet for controlling said lever, said magnet extending through said casing.

6. A device of the class described, comprising in combination, a casing, a flexible member mounted in said casing having a plurality of connected units, each of said units being composed of plates fastened together at their edges having a bow shaped outline with central cross section, a pivoted arm connected to the lowermost one of said units, the uppermost one of said units being suspended from the casing and pipes for introducing fluid pressure into the interior of the casing and the flexible member respectively.

7. A device of the class described, comprising in combination, a casing, a flexible member mounted in said casing having a plurality of connected units, each of said units being composed of plates fastened together at their edges having a bow shaped outline along a central cross section, a pivoted arm connected to the lowermost one of said units, the uppermost one of said units being suspended from the casing, pipes for introducing fluid pressure into the interior of the casing and the flexible member respectively, a block of insulating material mounted within said casing, contact points mounted in said block for coöperating with said arm, electric recording mechanism connected to said contacts and means for periodically throwing said arm against said block.

8. The combination with an outer casing of a flexible member arranged therein and suspended from the top of said outer casing, said member comprising a series of hollow substantially bow shaped devices connected and communicating with one another, there being pipe connections with the interior of said flexible member, and with the interior of said casing to introduce liquid therein, and mechanism connected with the bottom of said flexible member and operable by the vertical movement of said bottom.

9. The combination with an outer casing of a flexible member arranged therein and suspended from the top of said outer casing, said member comprising a series of hollow substantially bow shaped devices connected and communicating with one another, there being pipe connections with the interior of said flexible member and with the interior of said casing to introduce liquid therein, and mechanism connected with the bottom of said flexible member and operable by the vertical movement of said bottom, said mechanism comprising a downwardly extending rod and means operated thereby.

10. The combination of an outer casing, an expansible and contractible member arranged therein and comprising a series of hollow drums, each capable of expansion and contraction, said drums being connected to and communicating with one another, said drums being arranged one above the other and the upper one being connected to the top of the casing by a tubular device or pipe forming an inlet through the top of the casing into the interior of the uppermost drum, said casing having an opening admitting liquid into its interior outside of said expansible and contractible member, recording mechanism, and means for actuating said recording mechanism comprising a vertically reciprocable rod connected with the bottom of said expansible and contractible member and having means for operating said recording mechanism by its vertical reciprocation.

11. The combination of an outer casing, an expansible and contractible member arranged therein and comprising a series of hollow drums, each capable of expansion and contraction, said drums being connected to and communicating with one another, said drums being arranged one above the other and the upper one being connected to the top of the casing by a tubular device or pipe forming an inlet through the top of the casing into the interior of the uppermost drum, said casing having an opening admitting liquid into its interior outside of said expansible and contractible member, recording mechanism, and means for actuating said recording mechanism comprising a vertically reciprocable rod, connected with the bottom of said expansible and said contractible member, and having means for operating said recording mechanism by its vertical reciprocation, and pilot tubes for use in connection with a flowing stream, the up-stream tube being connected with the pipe leading to the interior of the drum, and the down-stream tube being connected to the aperture opening into the interior of the casing.

In witness whereof, I hereunto subscribe my name this 18th day of February, A. D., 1910.

EDWARD S. COLE.

Witnesses:
  Miss L. Burrows,
  Bessie M. Costigan.